UNITED STATES PATENT OFFICE.

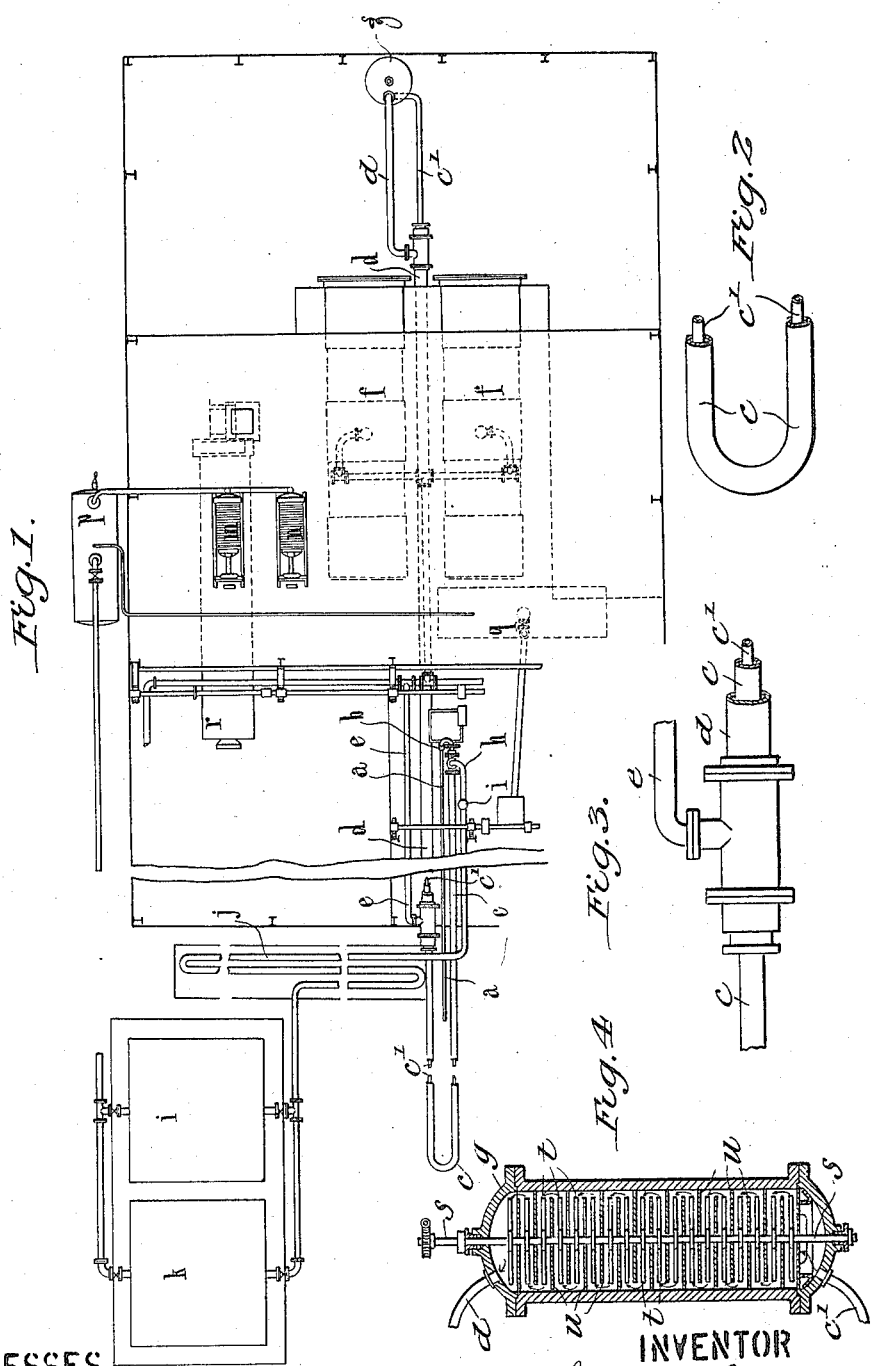

JENS ORTEN-BÖVING, OF LONDON, ENGLAND, ASSIGNOR TO THE SEWAGE SYNDICATE LIMITED, OF LONDON, ENGLAND.

TREATMENT OF SEWAGE.

1,161,600.  Specification of Letters Patent.  Patented Nov. 23, 1915.

Application filed October 23, 1914. Serial No. 868,322.

*To all whom it may concern:*

Be it known that I, JENS ORTEN-BÖVING, a subject of the King of Sweden, and residing at 9½ Union Court, London, E. C., England, have invented certain new and useful Improvements Relating to the Treatment of Sewage, of which the following is a specification.

It is old to subject sewage to heat treatment to destroy slimy matter in the wet material and thus to facilitate the subsequent production, by pressing, of relatively solid and water-free material from the sewage.

In carrying out this process I have observed that under certain circumstances and notably in the presence of a substantial amount of fatty and greasy matter in the sewage notwithstanding the heat treatment the separation of the liquid while possible under relatively low pressure is a tedious operation requiring a considerable time.

Now as the result of investigations I have observed that this difficulty disappears if the material is both well cooled and subjected to settling before being subjected to the pressing operation. It would seem that the determining factor is the partial or entire solidification of the grease and fat which until the liquid is sufficiently cooled remain in a more or less liquid condition and choke the press cloths rendering them difficultly pervious to the watery liquid which is to be expressed.

In one instance, when working with a sludge which contained about 18% of fatty matter (calculated on the dry solid), I succeeded in reducing by about four-fifths the time required for pressing to the same water content by effecting pressing only after cooling to about 30° C. and likewise permitting of settling instead of pressing the material at about 70° C. as had been done previously.

As a considerable quantity of clear liquid, easily separable by draining or otherwise, rises above the treated material when the latter is allowed to remain more or less quiescent this can be separated and the mass of material to be pressed and the consequent necessary capacity of the presses can be much reduced.

This invention consists broadly in rendering the liquid of sewage sludge and the like heated as indicated more readily expressible (where difficulties in this direction present themselves) by effecting appropriate cooling and settling of the material before subjecting it to the pressing or like operation.

The most convenient method for effecting cooling and settling, with or without decantation, will depend upon the circumstances of each case. Thus, where tubular heating and heat recuperating appliances are employed for the heating process if the recuperation of heat is carried so far that the material has been cooled sufficiently before it leaves the apparatus, the only after treatment necessary is settling. On the other hand if the material leaves the recuperator at an unduly high temperature it may be necessary to provide special cooling appliances in addition to the settling devices or at least so to effect the settling that cooling can simultaneously occur.

The amount of settling desirable will vary according to circumstances but with the material above instanced, I have found a settling period of four to six hours to be sufficient for producing an easily pressed material.

Referring now to the accompanying drawings, which show diagrammatically an installation suitable for carrying out the process: Figure 1 is a complete plan of the installation; Fig. 2 an enlarged portion of a heat recuperator; Fig. 3 an enlarged portion of a steam jacketed heater; and Fig. 4 a sectional view of a vessel for maintaining the material at a predetermined temperature.

In this the raw sludge is supplied by a pipe *a* to a pump *b* by which it is forced at the appropriate pressure into the annular space between two concentric tubes *c* and *c'* forming a heat recuperator *c*. This tube system for a part of its length is inclosed in a steam jacket *d* supplied with steam by a pipe *e* from boilers *f*. At one extremity the inner and outer tubes of the tube system are connected to a vessel *g* provided as shown in Fig. 4 with stirring elements *t* on a shaft *s*, and fixed plates *u*, the function of this vessel being to maintain the heated material at or about the predetermined maximum temperature for some time before it returns to the heat recuperator so as to secure the more complete destruction of water binding matters. The treated material leaves the heat recuperator by the pipe *h* and passing through the regulating valve *i* enters a cooling coil *j* in which its temperature can be brought down to say 30° C.

From this coil the material passes into one of two or more settling tanks *k* and *l* in which it is allowed to rest for a sufficient period after which the supernatant liquid is drawn off in any appropriate manner and the sludge sent to filter presses.

By employing two or more settling tanks alternately the contents of one may be allowed to settle while the others are emptying or filling The sludge is in the form shown supplied from the settling tanks to either of two filter presses *m* and *n* by allowing it to flow by gravity into a vessel *p* from which it can afterward be forced by compressed air (from vessel *q*) into the press. A kiln drier in which the press cake can be more fully dried is indicated at *r*.

By applying the principles above referred to, I have succeeded in such a plant in producing from the material instanced press cakes of relatively low water content after a pressing of only some one or two hours at a pressure of 80 lbs. per square inch. At higher pressures even shorter pressing period can be employed.

Having now described my invention what I claim as new and desire to secure by Letters Patent is:—

1. A process for separating the solids of sewage sludge and the like in a relatively water-free state consisting in heating this material under pressure to a temperature and for a time sufficient to destroy slimy water binding matters, thereafter subjecting it to cooling to a temperature of about 30 degrees C. to thorough settling and to a pressing dewatering operation; as set forth.

2. A process for separating relatively water-free solids from sewage sludge consisting in passing the sludge under pressure through a heating zone so as to raise its temperature to that at which destruction of slimy water binding matter can occur, thereafter maintaining it at about this temperature until destruction of such matter has occurred to a sufficient extent, passing it through a cooling zone adapted to transfer its heat at least in part to further untreated material and to cool it to about 30° C. then subjecting it to a decanting operation and finally exposing the sludgy mass of treated solids to filter pressing; as set forth.

In testimony whereof I have signed my name to this specification in the presence of two subscribing witnesses.

JENS ORTEN-BÖVING.

Witnesses:
T. SAMSON,
BERTRAM H. MATTHEWS.

Copies of this patent may be obtained for five cents each, by addressing the "Commissioner of Patents, Washington, D. C."